United States Patent [19]

Nelson et al.

[11] Patent Number: 5,612,734
[45] Date of Patent: Mar. 18, 1997

[54] EYE CONTACT APPARATUS EMPLOYING A DIRECTIONALLY TRANSMISSIVE LAYER FOR VIDEO CONFERENCING

[75] Inventors: Terence J. Nelson, New Providence; Barry R. Vaning, Mountainside, both of N.J.

[73] Assignee: Bell Communications Research, Inc., Morristown, N.J.

[21] Appl. No.: 557,591

[22] Filed: Nov. 13, 1995

[51] Int. Cl.$^6$ .................................................. H04N 7/12
[52] U.S. Cl. .............................. 348/20; 348/14; 313/478; 359/296
[58] Field of Search .................................... 348/14, 15, 20, 348/335, 835, 834; 359/296; 313/478, 474

[56] References Cited

U.S. PATENT DOCUMENTS

| | | | |
|---|---|---|---|
| 4,663,562 | 5/1987 | Miller et al. | 313/478 |
| 5,104,210 | 4/1992 | Tokas | 359/296 |
| 5,117,285 | 5/1992 | Nelson et al. | 348/335 |
| 5,317,405 | 5/1994 | Kuriki et al. | 348/20 |
| 5,400,069 | 3/1995 | Braun et al. | 348/20 |
| 5,422,683 | 6/1995 | Tanigaki | 348/15 |

OTHER PUBLICATIONS

*Optical Systems Light Control Film*, 3M Safety and Security Systems Division, pp. 1–6, St. Paul, Minn., undated.

*Primary Examiner*—Wing F. Chan
*Attorney, Agent, or Firm*—Loria B. Yeardon

[57] ABSTRACT

Apparatus for establishing eye contact between communicating parties during video conferencing comprises mirrors, a directionally transmissive layer, such as a louver assembly, and a camera are positioned, with respect to one another such that more intimate communication is realized between the parties without substantially reducing the transmissivity of the apparatus. Internal to this apparatus, the louver assembly is located in front of the terminal screen and passes an image of the distant party radiated from the terminal screen which is substantially parallel to microlouvers of the louver assembly. A first mirror, which is partially silvered, reflects the image of the local party and transmits the image of the distant party that is radiated from the terminal screen and passed by the louver assembly. The reflected image of the local party is directed toward a second mirror located below the first mirror. The second mirror is positioned to capture the image of the local party from the first mirror and to reflect this image into a miniature camera. An outstanding advantage of our inventive apparatus is that improved contrast at the camera between the desired image of the local party and the undesired image of the remote party, is achieved. This advantage is achieved without significantly compromising the transmissivity of the image radiated from the terminal screen and viewed by the local party and the transmissivity of the image of the local party captured by the camera. Prior apparatuses employing polarizers tradeoff transmissivity for improved contrast.

2 Claims, 5 Drawing Sheets

EYE CONTACT APPARATUS EMPLOYING A DIRECTIONALLY TRANSMISSIVE LAYER FOR VIDEO CONFERENCING

RELATED PATENT

Reference is made to U.S. Pat. No. 5,117,285, which issued on May 26, 1992 and is entitled Eye Contact Apparatus for Video Conferencing, for inventors T. J. Nelson and L. S. Smoot, wherein a related invention is disclosed and claimed, and which patent is hereby incorporated by reference.

FIELD OF INVENTION

This invention relates to a video-conferencing apparatus and more particularly to such apparatus which enables communicating parties to have eye contact with one another.

BACKGROUND OF THE INVENTION

Communications between distant parties have evolved with an emphasis on more personal and intimate contact between communicants. This emphasis is clearly noted as we observe the shift from written communications (letters and telegraphs) to voice and data communications (telephony) and on to visual communications (video conferencing). However, even with the evolution of video conferencing, communicants still express a need for greater intimacy through eye contact.

Attempts have been made to create eye contact between communicating parties; however, limitations and shortcomings associated with these schemes negate the intimacy and advantages gained in utilizing video communications. In a typical video-conferencing configuration, the video camera and terminal screen are not in line with one another, but are arranged such that a communicating party has the choice of either facing the camera to appear attentive to the distant party or facing the terminal screen to view the image of the distant party. Either choice under this disposition precludes eye-to-eye contact between communicating parties.

One prior attempt to create eye contact entailed placing a half-silvered mirror with a camera behind it within a teleconferencing terminal and a display screen being off to one side. In this set-up, the image radiated onto the display screen of a distant party is reflected by the half-silvered mirror toward the local party, while the image of the local party is passed by the half-silvered mirror and scanned by the camera. Such an arrangement does result in eye contact between parties; however, a number of negative effects result as well.

In changing the internal contents and configuration of the conventional teleconferencing terminals, specially-designed terminals will be required which may render the video-conferencing application cost-prohibitive. Furthermore, given the positioning of the display screen, the image projected to the local party appears recessed into the screen and distant. Therefore, the intimacy gained in achieving eye contact is lost in the recession of the projected image.

Another prior attempt to create eye contact via a new video-conferencing terminal design employed a video projection source, a video camera, a half-silvered mirror and a liquid-crystal screen and is described in L. S. Smoot, U.S. Pat. No. 4,928,301, May 22, 1990. The liquid crystal screen with an excitation at a sufficient control voltage can be rapidly switched from a transparent to a translucent state. This terminal operates in two modes: a capture mode and an image display mode. During the image capture mode, the liquid crystal display is excited such that the front surface screen is made transparent and the video camera detects a head-on image of a local party. During the image display mode, the liquid crystal screen is translucent and serves as a rear-projection screen to display the image of a distant party generated by the video projector source and reflected by the half-silvered mirror. In a teleconferencing system employing two such terminals, synchronization must be maintained between terminals in order to maintain effective communications and eye contact.

This bi-modal operation and configuration of the terminal ensure eye contact between communicating parties; however, as with other previously-developed eye contact structures, there are drawbacks which discourage its practical application. This arrangement requires a new specially-designed terminal which would replace and render useless terminals previously purchased for video conferencing. Furthermore, under this arrangement, synchronization is required to achieve proper communication between terminals. Maintenance of timing between terminals is not required in conventional video-conferencing systems; therefore, the added complexity of synchronization along with other drawbacks imposed by the implementation of this prior terminal outweighs the advantages realized in achieving eye contact and discourages its use.

Other eye contact arrangements have been attempted which require no alterations to video conferencing terminals already in use. In an experiment to assess the relationship between eye contact and a communicant's satisfaction with video conferencing, an apparatus was described using mirrors and cameras to achieve eye contact in the paper Designing Videoconference Facilities for Improved Eye Contact, S. R. Acker and S. R. Levitt, Journal of Broadcasting & Electronic Media, Volume 31, No. 2, Spring, 1987, pp. 181–191. In this arrangement, a half-silvered mirror positioned at an angle of 45° to the video conferencing terminal screen is located between the local party and the video-conferencing terminal in order to combine light paths of the terminal display and camera. This half-silvered mirror reflects the image of the local party to a full-silvered mirror which directs the image into cameras for transmission to a distant terminal. Simultaneously, the image radiated from the terminal screen of a distant party is passed by the half-silvered mirror for viewing by the local party.

Although, this apparatus achieves eye contact with no alterations to existing video-conferencing terminals, the positioning and angling of the mirrors and cameras with respect to one another make the apparatus very bulky and thus not conveniently used in conjunction with an existing terminal screen. Furthermore, an objection to this arrangement is that the display appears to be deeply recessed into the terminal; this is primarily the result of the protrusion distance of the apparatus from the terminal screen.

In view of these drawbacks and shortcomings of prior terminals and apparatus, it is the object of the present invention to provide an apparatus which establishes eye to eye contact between communicating parties without alteration to existing video-conferencing terminals and structured such that more intimate communication between the parties is realized.

In prior Nelson et al U.S. Pat. No. 5,117,285 (hereinafter, U.S. Pat. No. '285) an apparatus for use in video-conferencing applications to establish eye contact between a local party and the image of a distant party appearing on the terminal screen is described. This apparatus comprises polarizers, mirrors, and a camera, and these components are positioned and angled with respect to one another in a special well-defined manner to achieve eye contact such that the apparatus protrudes a minimal distance from the terminal screen.

Internal to this apparatus, a first polarizer and a first mirror are located in line between the local party and the terminal screen. The first polarizer located directly in front of the terminal screen passes a polarization of the image of the distant party radiated from the terminal screen. The first mirror, which is partially silvered, reflects the image of the local party and transmits the image of the distant party that is radiated from the terminal screen and passed by the first polarizer. The reflected image of the local party is directed toward a second mirror located below the first mirror. The second mirror is positioned to capture the image of the local party from the first mirror and to reflect this image into a miniature camera. The second mirror also inadvertently captures light that is transmitted by the first mirror which can cause the camera to pick up an extraneous image of the distant party. A second polarizer, which is cross-polarized with the first polarizer, is located between the second mirror and the camera and serves to minimize the extraneous light of the distant party entering the camera for improved contrast.

The apparatus of U.S. Pat. No. '285 overcomes a number of shortcomings and limitations of other apparatus used to create eye contact. However, an area for improvement of the apparatus of U.S. Pat. No. '285 is the transmissivity of the apparatus. Specifically, because the apparatus of U.S. Pat. No. '285 employs first and second polarizers, each of which passes light having a particular polarization and rejects light of an orthogonal polarization, substantial amounts of light that would otherwise improve the image viewed by the local party and captured by the camera party are rejected and the overall transmissivity of the system is reduced.

Therefore, it is an additional object of our present invention to improve upon the prior apparatus of U.S. Pat. No. '285 and provide an apparatus which establishes eye to eye contact between communicating parties without alteration to existing video-conferencing terminals and structures and without substantial reduction in the transmissivity, such that more intimate communication between the parties is realized.

SUMMARY OF THE INVENTION

Our present invention relates to an apparatus which establishes eye-to-eye contact between communicating parties without alteration to existing video-conferencing terminals such that more intimate communication is realized between the parties without substantially reducing the transmissivity of the apparatus. Our apparatus comprises mirrors and a miniature camera, but distinct from prior apparatuses, our apparatus does not include a first and second polarizers which reduce the overall transmissivity of the apparatus. Instead, our apparatus comprises a directionally transmissive layer, such as a louver assembly.

The directionally transmissive layer is located directly in front of the terminal screen and passes light, including the image of the distant party radiated from the terminal screen, that is substantially angled perpendicular to microlouvers within the directionally transmissive layer. The transmissive layer serves the combined functions of the polarizers of prior apparatuses and in addition, offers the added advantage of significantly improving the transmissivity of the image of the local party captured by the camera and the transmissivity of the image of distant party radiated from the terminal screen to the local party.

Our apparatus also includes a partially-silvered mirror which is located between the local party and the directionally transmissive layer. The partially-silvered mirror reflects the image of the local party and transmits the image of the distant party radiated from the terminal screen and passed by the directionally transmissive layer. The reflected image of the local party is directed toward a camera module, which is located directly below the partially-silvered mirror and positioned horizontally parallel to the terminal screen.

The camera module comprises a second mirror and a miniature camera. However, unlike prior apparatuses, the camera module of our apparatus does not include a second polarizer, which reduces the transmissivity of the apparatus. The image reflected from the partially-silvered mirror of the local party is directed toward the second mirror which is located below the partially-silvered mirror. The second mirror is positioned to capture the image of the local party from the partially-silvered mirror and to reflect this image into the miniature camera.

The organization and operation of our present invention will be understood from consideration of the detailed description of the illustrative embodiment, which follows, when taken in conjunction with the accompanying drawing.

DETAILED DESCRIPTION

Figure 1:
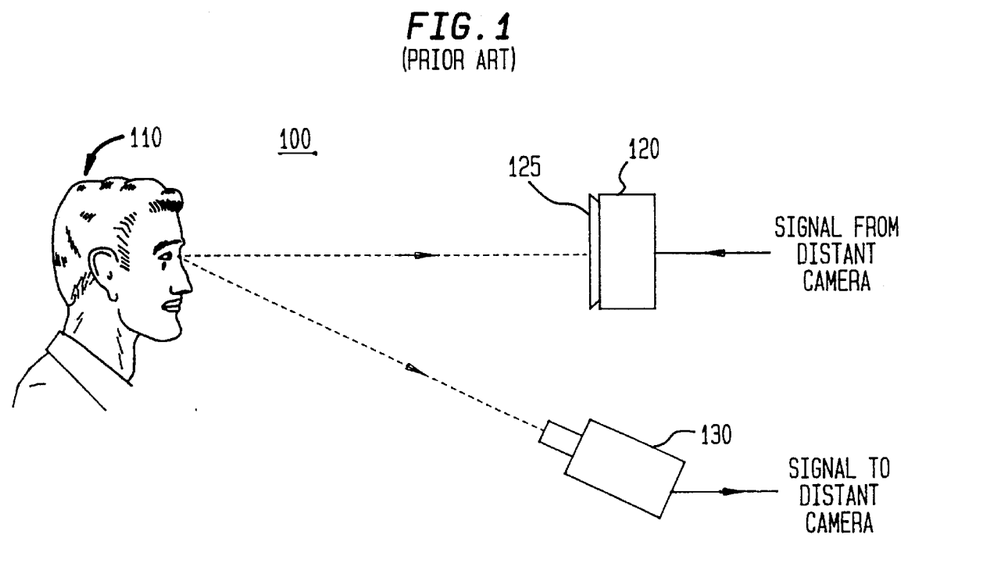
FIG. 1 schematically illustrates a typical video-conferencing configuration from the prior art in which the video camera and terminal screen are not in line with one another.

FIG. 1 schematically illustrates a conventional video-conferencing configuration 100 from the prior art. Under such an arrangement, the video camera 130 and a conventional terminal 120 are not in line with one another. Therefore local party 110 must choose to either gaze into the terminal screen 125 to view the image of a distant party or into a video camera 130 to appear attentive to a distant party (not shown) at a distant video-conferencing terminal (not shown). Either choice under this arrangement precludes eye-to-eye contact between communicating parties.

Figure 2:
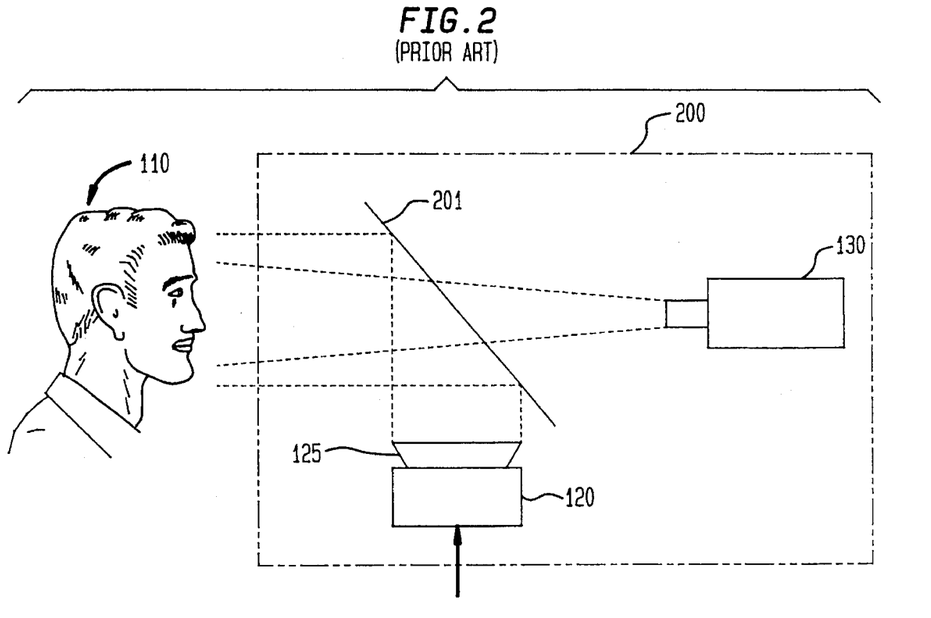
FIG. 2 schematically illustrates a video-conferencing terminal from the prior art which allows eye contact between communicants with mirrors and a camera designed within the terminal.

In FIG. 2 a video-conferencing terminal 200 from the prior art is schematically illustrated which allows eye contact between a local party 110 and a distant party (not shown), and the terminal design calls for essential components to be located within the terminal 200. In this set-up, the image of a distant party radiated onto a terminal screen 125 on the front of the terminal 120 is reflected by a half-silvered mirror 201 toward the local communicating party 110, while the image of the local party 110 is passed by the half-silvered mirror 201 and scanned by a camera 130. Such an arrangement does result in eye contact between parties; however, in changing the internal contents and configuration of the conventional video-conferencing terminal 120 (shown in FIG. 1) a specially-designed terminal will be required. Given the positioning of the display screen within the terminal, the image projected to the local party appears recessed into the screen and distant.

Figure 3:
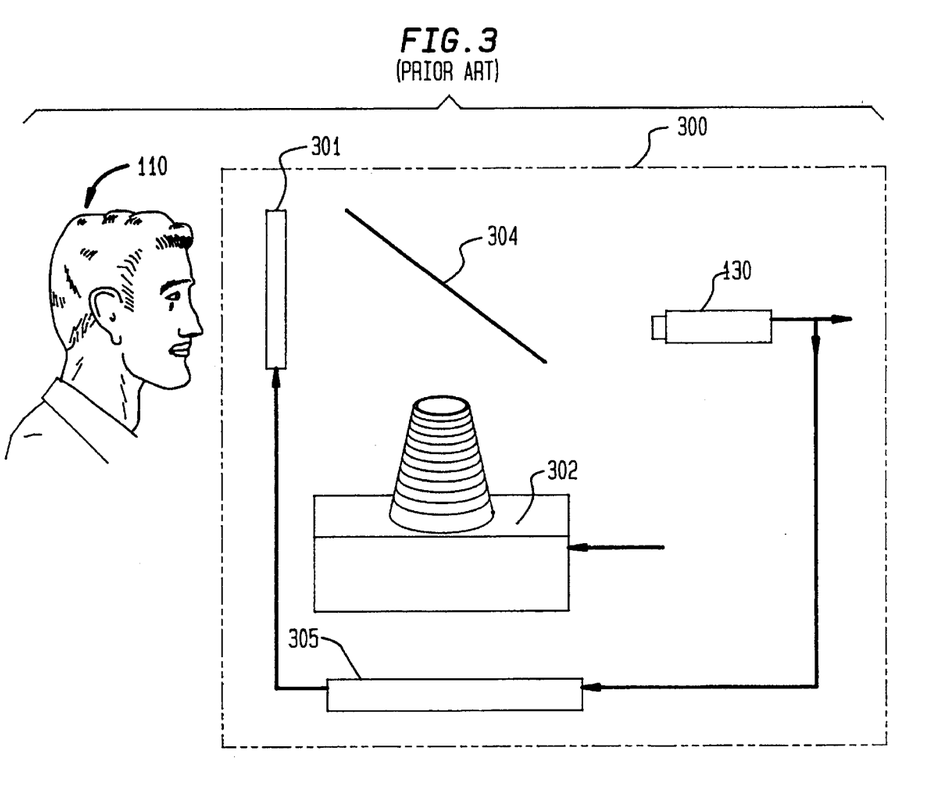
FIG. 3 schematically illustrates a teleconferencing terminal from the prior art using a liquid crystal display which operates in an image capture mode and an image display mode.

FIG. 3 schematically illustrates another prior art video-conferencing terminal 300 employing a liquid crystal display 301. This video-conferencing terminal 300 employs a design which incorporates a video projection source 302, a video camera 130, a half-silvered mirror 304 and a liquid crystal display 301. This terminal operates in two modes: an image capture mode and an image display mode. During the image capture mode, the liquid crystal display 301 is excited by a control circuit 305 such that its front surface is made transparent and the video camera 130 detects a head-on image of a local party 110. During the image display mode, the liquid crystal display 301 is translucent and serves as a rear-projection screen to display the image of a distant party generated by the video projection source 302 and reflected by the half-silvered mirror 304. In a teleconferencing system which employs two terminals, synchronization must be maintained between terminals in order to maintain effective communications and eye contact unlike conventional video conferencing systems 100 (shown in FIG. 1). Furthermore, implementation of this new specially-designed terminal would replace and render useless conventional terminals previously purchased for video conferencing.

Figure 4:
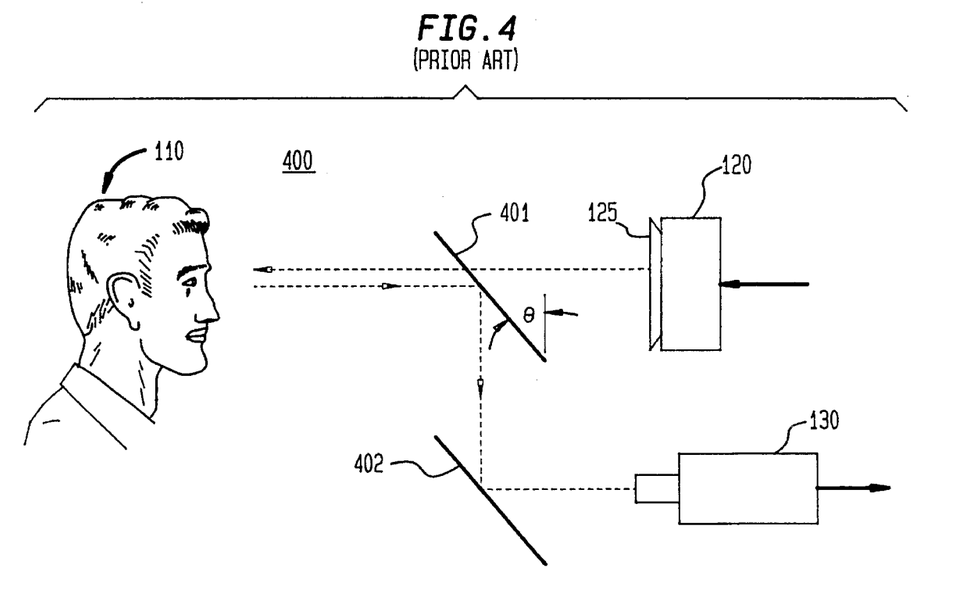
FIG. 4 schematically illustrates an arrangement described in the prior art to achieve eye contact without alteration to the existing video-conferencing terminal.

Unlike the eye contact terminals described in FIGS. 2 and 3, the eye contact arrangement 400 schematically illustrated in FIG. 4 is a different prior arrangement that works in conjunction with a conventional video-conferencing terminal 120 already in-use to achieve eye contact between communicating parties. In this arrangement, a half-silvered mirror 401, which is positioned at an angle θ substantially equal to 45° to the terminal screen 125, is located between the local party 110 and the video-conferencing terminal 120 in order to combine light paths of the terminal display 125 and the camera 130. The half-silvered mirror 401 reflects the image of the local party 110 to a full-silvered mirror 402 which is parallel to the half-silvered mirror 401. The full-silvered mirror then reflects the image of the local party 110 into a camera 130 for transmission to a distant terminal (not shown). Simultaneously, the image radiated from the terminal display 125 of a distant party is transmitted through the half-silvered mirror 401 for viewing by the local party 110.

Although this apparatus achieves eye contact with no alterations to existing video-conferencing terminals, the positioning and angling of the mirrors and cameras with respect to one another makes the apparatus very bulky, inconvenient and impractical. Furthermore, an objection to this arrangement 400 is that the display appears to be deeply recessed into the terminal. This objection comes largely as a result of the protrusion distance of the arrangement from the terminal screen 125 which is constrained by the 45° angle between the half-silvered mirror 401 and the terminal screen 125.

Figure 5:
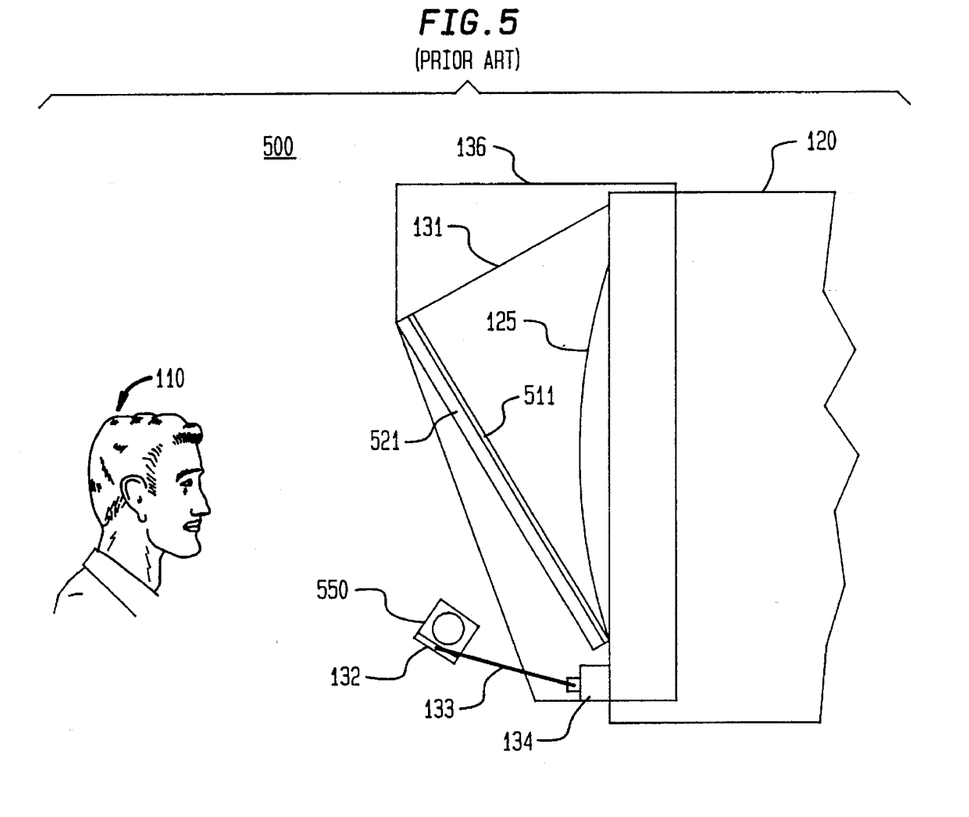
FIG. 5 schematically illustrates a side view of an eye-contact apparatus in accordance with an illustrative embodiment of a prior apparatus described in U.S. Pat. No. '285.

The apparatus of prior U.S. Pat. No. '285 establishes eye-to-eye contact between communicating parties without alteration to existing video-conferencing terminals such that more intimate communication is realized between the parties. FIG. 5 schematically depicts a side view of an eye-contact apparatus 500 of this prior invention.

The apparatus of prior U.S. Pat. No. '285 comprises polarizers, mirrors, and a miniature camera. As shown in FIG. 5, internal to the apparatus 500 a polarizer 511 and a partially-silvered mirror 521 are located between the local party 110 and the terminal screen 125. The polarizer 511 located directly in front of the terminal screen 125 passes a polarization of the image of the distant party radiated from the terminal screen 125 that is substantially parallel to its direction of polarization. The partially-silvered mirror 521 reflects the image of the local party 110 and transmits the image of the distant party that is radiated from the terminal screen 125 and passed by the polarizer 511. The reflected image of the local party 110 and the transmitted image of the distant party are both directed toward a camera module 550. However, the polarized image of the distant party is absorbed by a second polarizer located in the camera module 550.

EYE CONTACT APPARATUS OF THE PRESENT INVENTION

Figure 6:
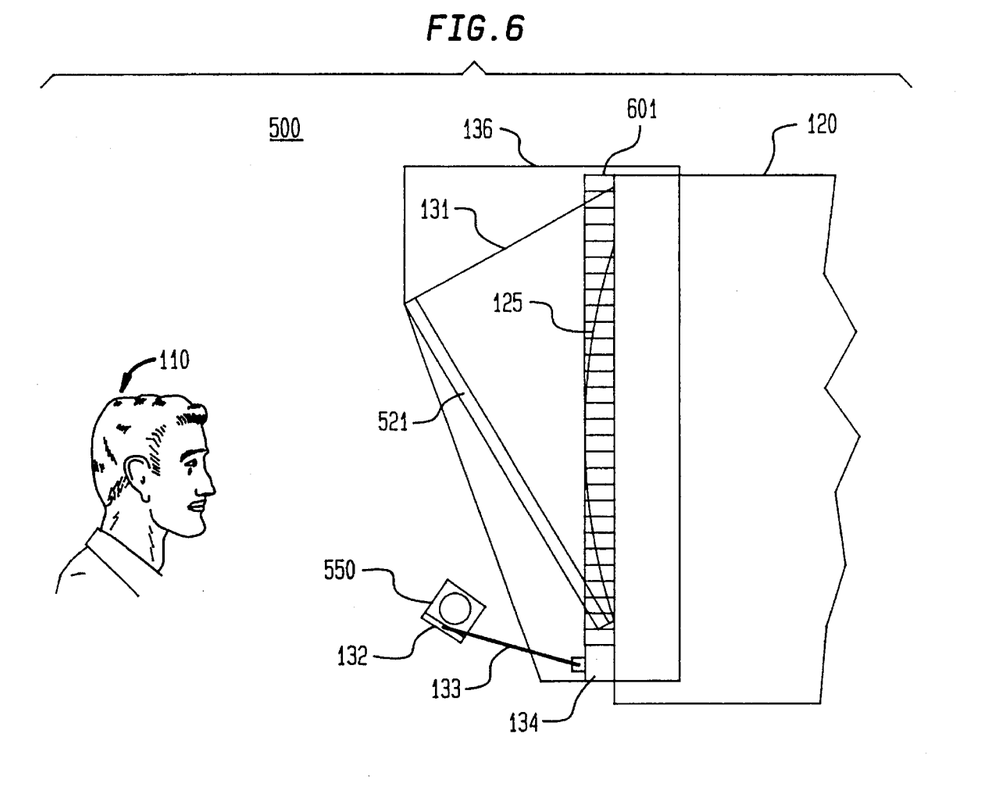
FIG. 6 schematically illustrates a side view of an eye-contact apparatus employing a directionally transmissive layer in accordance with an illustrative embodiment of our present invention.

Our present invention also relates to an apparatus which establishes eye-to-eye contact between communicating parties without alteration to existing video-conferencing terminals such that more intimate communication is realized between the parties. FIG. 6 schematically depicts a side view of an eye-contact apparatus 600 in accordance with an illustrative embodiment of our present invention. Our apparatus is a compact assembly which can be used in conjunction with or, as shown in FIG. 6, mounted directly onto a conventional video-conferencing terminal 120. In this particular construction, the apparatus is encased in a hood 136 (discussed further in Section A) and mounted onto the terminal screen with velcro strips (not shown) or small screws, either method being adequate since the apparatus is lightweight.

Similar to the prior apparatus of U.S. Pat. No. '285, our apparatus comprises mirrors and a miniature camera, but distinct from this prior apparatus, our apparatus does not include a polarizer which reduces the overall transmissivity of the apparatus. Instead, the apparatus of the present invention comprises a directionally transmissive layer, such as a louver assembly, positioned in front of, and in line with, the terminal screen. The components of the apparatus of our invention are geometrically positioned and angled with respect to one another in a special well-defined manner to achieve eye contact such that the apparatus protrudes a minimal distance from the terminal screen 125.

Specifically, as shown in FIG. 6, internal to our apparatus 600, a directionally transmissive layer 601 and a partially-silvered mirror 521 are located between the local party 110 and the terminal screen 125. The directionally transmissive layer is located directly in front of the terminal screen 125 and passes light, including the image of the distant party radiated from the terminal screen 125 that is substantially angled perpendicular to the directionally transmissive layer. The partially-silvered mirror 521 is located between the local party 110 and the directionally transmissive layer. Mirror 521 reflects the image of the local party 110 and transmits the image of the distant party that is radiated from the terminal screen 125 and passed by the directionally transmissive layer 601. The reflected image of the local party 110 is directed toward a camera module 550.

Figure 8:
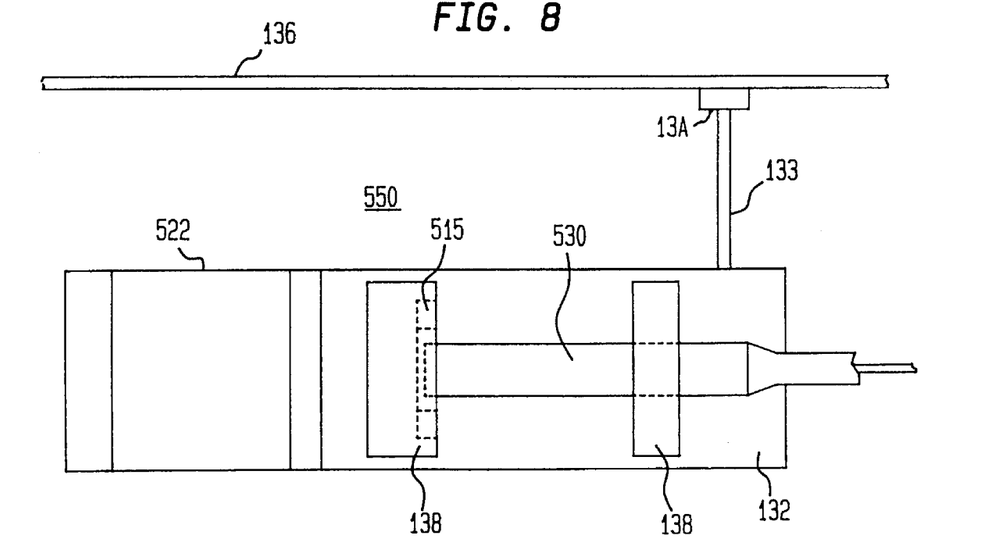
FIGS. 8 and 9 schematically illustrate a detailed depiction of a top view and side view, respectively, of a camera module employed in an eye contact apparatus in accordance with an illustrative embodiment of our present invention.
Figure 9:
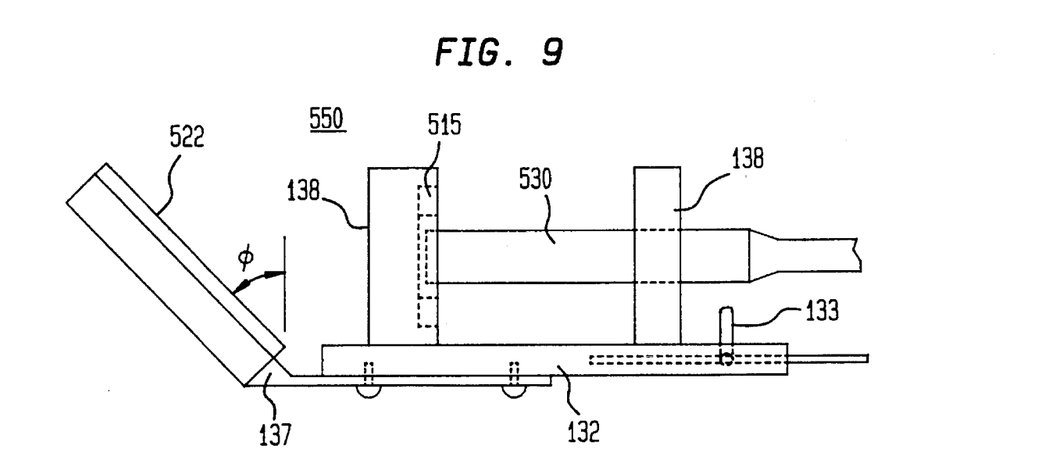

As shown in FIG. 6 similar to the apparatus 500 of U.S. Pat. No. '285, the camera module 550 is located directly below the partially-silvered mirror 521, is positioned horizontally parallel to the terminal screen 125, and, as shown in FIGS. 8 and 9, comprises a mirror 522 and a miniature camera 530. However, distinct from prior apparatus 500 of U.S. Pat. No. '285, apparatus 600 of our invention does not include any polarizer, which would reduce the transmissivity of the apparatus.

A. Camera Platform Module

As depicted in FIGS. 8 and 9, the camera module 550 is mounted on a platform 132 which is held on a platform mounting rod 133 attached to the bottom of the hood 136 via a rod fastener 134. The platform mounting rod 133 is affixed to the platform 132 at one end and to the rod fastener 134 at the other end to allow for rotating and raising or lowering the camera module 550. As shown in FIG. 8, the mirror 522 is mounted in an adjustable fixture 137 to allow the distance between the mirror 522 and the camera 530 to be varied so that the full view of the camera 530 can be taken through the mirror 522. The camera 530 is attached to the platform 132 by supports 138. Within the camera module 550, the mirror 522 is angled $\phi°$ to the camera and, in a preferred embodiment, $\phi$ is substantially 45°. Furthermore, the mirror 522 is non-parallel to the partially-silvered mirror 521 shown in FIG. 6.

The image reflected from the partially-silvered mirror 521 of the local party 110 is thus directed toward the mirror 522 which is located below the partially-silvered mirror 521. The mirror 522 is positioned to capture the image of the local party from the partially-silvered mirror 521 and to reflect this image into the miniature camera 530. Only the light reflected from the mirror 522 that falls within the camera's field of view will be captured by the camera, the camera's field of view being the area over which light is received by the camera.

An additional benefit of mirror 522 is that it effectively corrects the image of the distant party which is transposed upon reflection at the partially-silvered mirror 521. The mirror 522 also captures extraneous light of the distant party radiated from the terminal screen 125 and transmitted through the partially-silvered mirror 521. This extraneous light is then inadvertently reflected by mirror 522 toward the camera 530.

B. Apparatus Hood

As shown in FIG. 6, all components of the apparatus are mounted in a hood 136 which is a metallic or plastic assembly consisting of top and side pieces rigidly bound to maintain the positions and geometrical relationships between the components of the apparatus, as is critical to the optimal performance of the apparatus. An additional part of the hood assembly is a baffle 131 which covers the open space above the partially-silvered mirror 521. The baffle 131 is optimally painted black to prevent stray light from falling on the terminal screen 125. Furthermore, the exterior of parts and mount assemblies located inside the hood are optimally painted black to eliminate stray light and spurious reflections. A hood assembly constructed out of folded sheet metal or molded plastic is suggested to reduce the cost and weight of the apparatus.

C. Mirrors

The partially-silvered mirror 521 shown in FIG. 6 reflects the image of the local party 110 and transmits the image of the distant party that is radiated from the terminal screen 125 and passed by the directionally transmissive layer 601. The percentage of light that is reflected and transmitted by the mirror is dependent upon the reflectivity pre-selected for the mirror. Prior eye contact apparatus employ half-silvered mirrors which nominally have a reflectivity of 50%. Our analyses reveal that the reflectivity selected for the partially reflecting mirror 521 should be weighed and balanced based upon two factors: the brightness of the terminal screen 125 and the amount of light needed to achieve adequate transmission from the camera 530.

The total percentage of light reflected (X) and the light transmitted (Y) by the mirror is ideally 100% (i.e., X+Y= 100%). Therefore, a mirror having a reflectivity of 30% will reflect 30% of the light incident upon it in one direction and will transmit 70% of the light incident upon it in the other direction. Clearly, increasing the level of reflected light (i.e., selecting a mirror with a higher reflectivity) to improve camera reception will directly result in a reduction in the brightness of the light transmitted to the local party 110 from the terminal screen 125. Conversely, increasing the level of transmitted light (i.e., selecting a mirror with a lower reflectivity) to improve the perceived brightness from the receiving screen 125 will directly result in a reduction in the quality of the signal transmitted from the camera to the distant party. In an illustrative embodiment constructed of our invention, a reflectivity of 30% to 40% (and a transmissivity of 70% to 60%) was selected for the partially-silvered mirror 521.

In a preferred embodiment, mirror 522 shown in FIGS. 8 and 9 is a full-silvered mirror having a reflectivity of 100%; however, the full-silvered mirror may not necessarily be employed in all implementations of this invention. In rotating the camera module 550 such that it is perpendicular to the terminal screen 125 and captures light directly from the partially-silvered mirror 521, the second mirror 522 may be removed without departing from the spirit of the invention. This rotation of the camera module 550, causes the apparatus to protrude moderately further from the front of the terminal screen; however, such an arrangement allows more of the local party and their surroundings reflected by the first mirror to be directly captured by the camera without the size limitations imposed by the full-silvered mirror.

D. Directionally Transmissive Layer—Louver Assembly

Unlike the prior apparatus shown in FIGS. 5, 8, and 9, the apparatus of our present invention shown in FIG. 6 does not include polarizer 511 between the terminal screen 125 and the partially-silvered mirror 521 nor a polarizer between the mirror 522 and camera 530. Instead, the apparatus of our present invention includes a directionally transmissive layer, such as a louver assembly, for improving the contrast between the image of the local party 110 captured by the camera 530 and extraneous light of the distant party radiated from the terminal screen 125. The transmissive layer serves the combined functions of the polarizers of the prior apparatus of U.S. Pat. No. '285, but in addition, use of the louver assembly and elimination of the polarizers offer the added advantage of significantly improving the transmissivity of the image of the local party 110 captured by the camera 530 and the transmissivity of the image of distant party radiated from the terminal screen to the local party.

To reduce the interfering light from the terminal screen 125, louver assembly 601 is positioned between the terminal screen 125 and the partially-silvered mirror 521 and substantially parallel to the terminal screen 125 as shown in FIG. 6. The louver assembly 601 passes light from the terminal screen that is radiated at an angle substantially parallel to the microlouvers in the louver assembly 601, which light is transmitted by the partially-silvered mirror 521 to the local party 110. Light from the terminal screen that is radiated at an angle that is substantially perpendicular to the louvers is absorbed by the louver assembly 601 and thus prevented from entering the camera for improved contrast between the image of the local party and other extraneous light at the camera.

Unlike the prior apparatus, in our present invention, the transmissivity of the image radiated from the terminal screen 125 to the local party 110 and the transmissivity of the image of the local party captured at the camera are not sacrificed for improved contrast. In accordance with our invention, it is not necessary to tradeoff transmissivity for improved contrast as high transmissivity and improved contrast are both simultaneously attainable without either sacrificing the other.

To illustrate the difference in the transmissivity for the prior apparatus of U.S. Pat. No. '285 and our present invention, consider the following. For the prior apparatus of U.S. Pat. No. '285, the transmissivity ($T_{prior}$) of the image radiated from the terminal screen 125 to the local party 110 is equal to the transmissivity of the partially-silvered mirror 521 ($T_{mirror\ 521}$) times the transmissivity of the polarizer 511 ($T_{polarizer\ 511}$) as shown in Eq. 1;

$$T_{prior} = T_{mirror\ 521} \times T_{polarizer\ 511} \tag{1}$$

For our present invention, the transmissivity ($T_{present}$) of the image radiated from the terminal screen 125 to the local party 110 is equal to the transmissivity of the partially-silvered mirror ($T_{mirror\ 521}$) times the transmissivity of the louver assembly ($T_{louver}$) as shown in Eq. 2:

$$T_{present} = T_{mirror\ 521} \times T_{louver} \tag{2}$$

Our research has shown that the typical transmissivity of the partially-silvered mirror is 0.7, of the polarizer 511 is 0.4, and of the louver assembly is 0.75, thus resulting in the following typical transmissivities:

$$T_{prior} = (0.7)(0.4) = 0.28 \tag{3}$$

$$T_{present} = (0.7)(0.75) = 0.52 \tag{4}$$

Therefore, in accordance with our invention, the transmissivity of light radiated from the terminal screen to the local party is almost double the transmissivity achieved under the prior apparatus of U.S. Pat. No. '285.

A comparison of the transmissivities of light radiated from the local party and captured by the camera for the prior apparatus of U.S. Pat. No. '285 and for our present invention presents an even more compelling result. For the prior apparatus of U.S. Pat. No. '285, the overall transmissivity ($T_{prior}$) of the image radiated from the local party to the camera is equal to the reflectivity of the partially-silvered mirror ($R_{mirror\ 521}$) times the reflectivity of the fully-reflective mirror ($R_{mirror\ 522}$) times the transmissivity of the polarizer at the camera, which is polarizer 512 seen in FIGS. 7 and 8 of U.S. Pat. No. '285, ($T_{polarizer\ 512}$) as shown in Eq. 5:

$$T_{prior} = R_{mirror\ 521} \times R_{mirror\ 522} \times T_{polarizer\ 512} \tag{5}$$

For our present invention, the transmissivity ($T_{present}$) of the image radiated from local party to the camera is equal to the reflectivity of the partially-silvered mirror ($R_{mirror\ 521}$) times the reflectivity of the fully-reflective mirror ($R_{mirror\ 522}$) as shown in Eq. 6:

$$T_{present} = R_{mirror\ 521} \times R_{mirror\ 522} \tag{6}$$

Our research has shown that the typical reflectivity of the partially-silvered mirror is 0.3 and of the fully reflective mirror 522 is 1.0 and that the typical transmissivity of the polarizer 512 is 0.4, thus resulting in the following typical transmissivities:

$$T_{prior} = (0.3)(1)(0.4) = 0.12 \tag{7}$$

$$T_{present} = (0.3)(1) = 0.3 \tag{8}$$

Therefore, under our present invention, the transmissivity of light radiated from the local party to the camera is two and one-half times the transmissivity achieved under the prior apparatus of U.S. Pat. No. '285.

Figure 7:
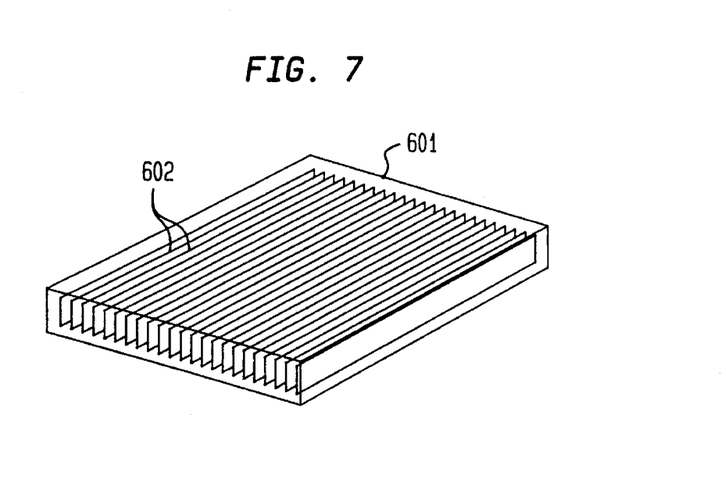
FIG. 7 schematically illustrates a louver assembly as a directionally transmissive layer in accordance with an illustrative embodiment of our present invention.

Illustratively, as shown in FIG. 7, the louver assembly 601 employed in our present invention is a thin plastic film comprising microlouvers 602 which are spaced approximately 0.005 to 0.010 inches apart. Each microlouver has a thickness of approximately 0.0005 inches, and the assembly has a depth of approximately 0.030 inches which depth ensures a minimal protrusion distance of the apparatus. Illustratively, the Optical Systems Light Control Film produced by 3M may be used as the louver assembly 601.

CONCLUSION

Thus, our invention overcomes a number of shortcomings and limitations of other apparatus used to create eye contact in video-conferencing. Specifically, our invention improves the contrast between the image of the local party captured by the camera and extraneous light of the distant party radiated from a terminal screen by using a directionally transmissive assembly, such as a louver assembly, in lieu of polarizers used in prior apparatus. An outstanding advantage of our inventive apparatus is that improved contrast is achieved without significantly reducing the transmissivity of the image radiated from the terminal screen and viewed by the local party and the transmissivity of the image of the local party captured by the camera, unlike prior apparatuses employing polarizers which tradeoff reduced transmissivity for improved contrast.

The embodiments of the above described apparatus for establishing eye contact between communicating parties during video conferencing are intended to be illustrative of our invention. Numerous alternative embodiments may be devised without departing from the spirit and scope of the following claims.

What is claimed is:

1. A video conferencing terminal without polarizers for allowing eye contact between a local party viewing a terminal screen and the image of a distant party on said screen, said terminal including a camera module for capturing the image of the local party for transmission to a distant party and a partially silvered mirror for transmitting the image of the distant party on said screen to the local party and for reflecting the image of the local party to said camera module, said terminal further comprising means for concurrently increasing the transmission of light from said screen to the local party, for improving the contrast at said camera module between the image of the local party and the light radiated from said screen, and for increasing the transmission of light from the local party to said camera module, said means comprising a louver assembly having microlouvers, said louver assembly being positioned on said screen and between said screen and said camera module.

2. A video conferencing terminal in accordance with claim 1 wherein said microlouvers of said louver assembly are oriented between said screen and the local party so that light from said screen that is radiated at an angle substantially parallel to the microlouvers is passed through to the local party while light from said screen that is radiated at an angle that is substantially perpendicular to said microlouvers is absorbed by said louver assembly and thus prevented from being transmitted by said partially silvered mirror to said camera module.

* * * * *